June 5, 1928.
A. SCHLABACH
LIGHT FOR MOTOR VEHICLES
Original Filed June 1, 1926
1,672,344
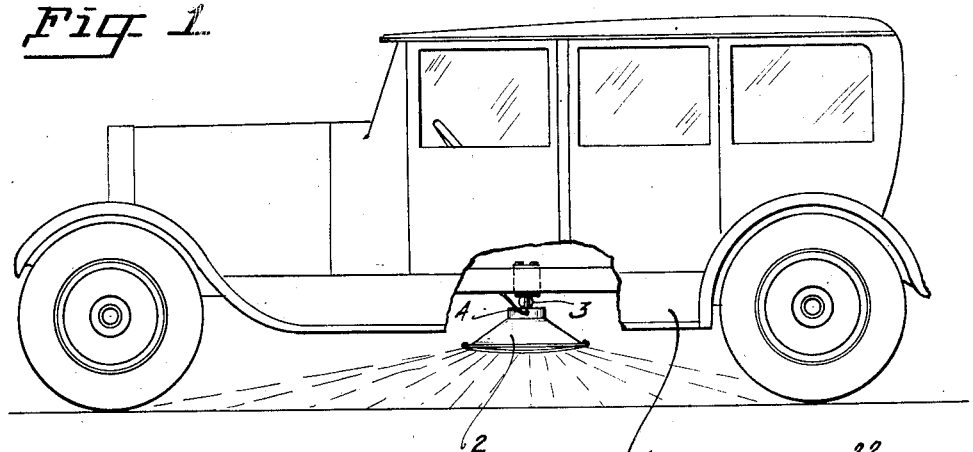
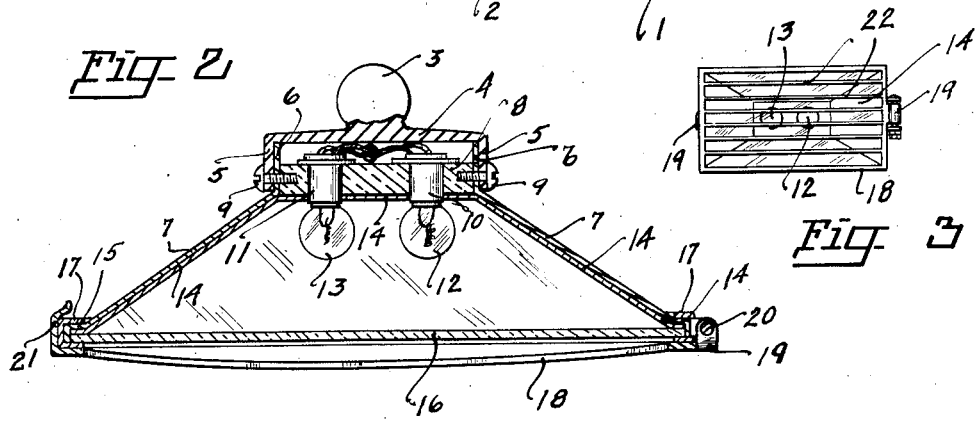
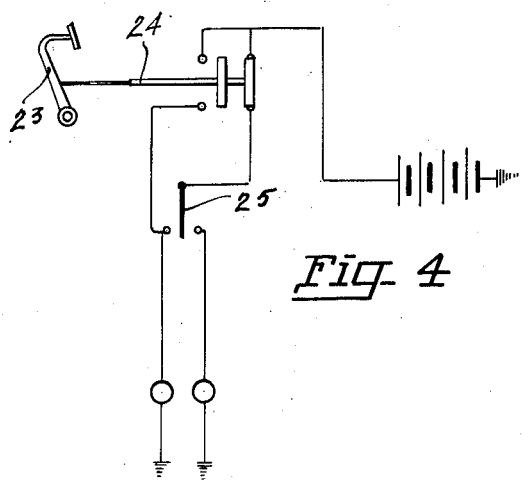
Inventor
Allan Schlabach
Attorney Patented June 5, 1928.

1,672,344

UNITED STATES PATENT OFFICE.

ALLAN SCHLABACH, OF HUBBARD, OREGON, ASSIGNOR OF ONE-HALF TO EMMA SCHLABACH, OF HUBBARD, OREGON.

LIGHT FOR MOTOR VEHICLES.

Application filed June 1, 1926, Serial No. 112,929. Renewed January 26, 1928.

My invention relates to improvements in lights for motor vehicles and is more especially adapted for use wherein a courtesy light is desired to illuminate the roadway for the approaching vehicle or for lighting the roadway for the admittance and departure of the occupant of the car upon which the same is installed.

Further objects of my invention relate to a selective color being provided within the light structure.

Still further objects of my invention rely in the guard being adapted to cover the face of the light and one that may be easily hinged away from the transparent closure to facilitate the cleaning of the same.

Still further objects of my invention relies in the swivel support for the same and one that will permit of the placing the light in any desired position and one that may be maintained in the placed position.

With these and incidental objects in view, the invention consists in certain novel features of construction and combination of parts, the essential elements of which are set forth in the appended claims and a preferred form of embodiment of which is hereinafter shown with reference to the drawings which accompany and form a part of this specification.

In the drawings:—

Fig. 1 is a side elevation of a motor vehicle with the body covering of the motor vehicle partially broken away to illustrate the location and adaptability of the light.

Fig. 2 is a vertical cross section view of the light.

Fig. 3 is an inverted plan view of the light.

Fig. 4 is a diagrammatical layout of the wiring system.

Like reference characters refer to like parts throughout the several views.

1 is the body of the motor vehicle, and 2 is the outer covering of the light. The light is attached to the motor vehicle through the medium of a ball and socket joint. The ball 3 is disposed upon the upper part of the lamp structure and is adapted to a socket connection that is secured directly to the body of the motor vehicle, means being provided in the socket connection to clamp the ball and maintain the same in clamped position. The body 4 of the ball is turned down at the sides as at 5, and maintains the upturned side walls 6 of the main covering 7 therein, thus forming a weather proof covering and one wherein there is but little likelihood of liquids being admitted within the main lamp structure. An insulating block 8 is placed within the closure thus formed and is maintained in place through the action of locking screws 9. Lamp sockets 10 and 11 are placed within the insulating block 8 to which lamps 12 and 13 are secured. These lamps are of different colors, and the lamps may be illuminated, each independent of the other, selective means being provided for the selective illumination of the one independent of the other. Reflector surface 14, is placed within the covering for reflecting the light being emanated from the lamps when illuminated. The reflector surface covers the whole interior of the lamp structure. A rim 15, is formed about the outer peripheral edges of the outer covering and the reflector member 14 is made to engage therewith. A transparent covering 16 is placed about the opening and completely covers the same. A peripheral closure 17, is formed about the outer edges and maintains a tight connection therebetween. A guard 18 having a hinge formed on its one side and terminating in upturned lugs 19 is in hinged relation with the pin 20 about which the guard is made to oscillate for the purpose of admittance to the transparent cover and to facilitate the cleaning of the same. This guard is formed into a series of bars 22 to make a grillage structure of the same. When the guard is placed in closed position a lip 21 engages with the peripheral closure and maintains the same in locked position. The lamps are wired to a source of electric energy and the circuit may be completed through either of the lamps by the closing of either of the circuits through the medium of the foot pedal 23, and the pull rod 24, or through the medium of the switch 25.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:—

1. In combination in a light for motor vehicles of an outer covering having upturned edges and an outwardly disposed peripheral edge, a body portion disposed about the upturned edges of the outer covering, a ball disposed central of the body portion, an insulating block disposed within the upturned edges of the outer covering, a reflecting surface within the outer covering, lamp sockets disposed within the insulating block, lamps disposed within the sockets, and an electric circuit connecting the lamps with a source of electric energy and selective means for passing the electric energy through either of the lamps independent of the other.

2. In a light for motor vehicles, a tapered body member terminating in an upper turned-up portion and a lower out-turned edge; a ball suspension member provided with a down turned body portion to embrace the aforesaid turned up portion; an insulating block within the aforesaid turned up portion; said block to carry illuminating elements; a reflecting surface within the body member; a transparent element closing the bottom of the body member; a peripheral rim embracing the outer edge of the transparent element and the aforesaid lower out-turned edge of the body member; and a grilled outer guard for the transparent element.

ALLAN SCHLABACH.